United States Patent [19]

Francis

[11] Patent Number: 5,608,604
[45] Date of Patent: Mar. 4, 1997

[54] HINGE AS AN ELECTRICAL CONDUCTOR

[75] Inventor: Richard M. Francis, Campbell, Calif.

[73] Assignee: Apple Computer, Inc., Cupertino, Calif.

[21] Appl. No.: 310,607

[22] Filed: Sep. 22, 1994

[51] Int. Cl.⁶ .................................. H05K 7/16; G06F 1/16
[52] U.S. Cl. ............................ 361/681; 16/342; 439/104; 439/31
[58] Field of Search ......................... 361/679, 680, 361/681, 683; 439/92, 95, 104, 108, 111, 181, 11, 13, 31; 16/342, 337; 364/708.1; G06F 1/16

[56] References Cited

U.S. PATENT DOCUMENTS

| | | | |
|---|---|---|---|
| 5,001,659 | 3/1991 | Watabe | 364/708.1 |
| 5,237,488 | 8/1993 | Moser et al. | 361/681 |
| 5,267,866 | 12/1993 | Swift et al. | 439/31 |
| 5,379,183 | 1/1995 | Okonsky et al. | 361/681 |
| 5,451,167 | 9/1995 | Zielinski et al. | 439/92 |
| 5,467,504 | 11/1995 | Yang | 16/342 |

*Primary Examiner*—Leo P. Picard
*Assistant Examiner*—Lynn D. Feild
*Attorney, Agent, or Firm*—Richard C. Liu

[57] ABSTRACT

A hinge-EMI grounding conductor is disclosed for an electronic device which has hinged operating portions, for example, a portable computer having a display housing hingedly attached to a main body housing. The present invention not only allows the angle between the two portable computer housings be rotably adjusted for optimal user operations but also provides a compact and economical way of implementing a conductive grounding path for purposes such as EMI shielding.

14 Claims, 1 Drawing Sheet

HINGE AS AN ELECTRICAL CONDUCTOR

BACKGROUND OF THE INVENTION

1. Field of Invention

This invention generally relates to electronic devices having hinges and, more particularly, to those hinges also serving as conductors for providing electrical paths between hinged means.

2. Description of Related Art

Portable computers are common in the market today. These portable computers, often referred to as notebook and sub-notebook computers, are versatile in that these computers may be used in "mobile" locations without AC power such as within a bus or an airplane. Because of their portability, weight and size are important considerations for their designs. As a result, a portable computer typically has a display housing brakingly engaged to a main body housing via one or more hinges enabling the two housings to fold against each other for ease of transport. But when in use, an optimal angle between the housings can be similarly rotably adjusted for user operations.

A problem for these portable computers is electromagnetic interference. Electromagnetic interference (EMI) or electrical noise disrupts the normal operation of electronic devices. Such disruption may be caused by its external cabling, power supplies, electronic components, display screen and the like. Such a disruption may even be caused by its external environment because an electronic device that radiates electrical noise is also susceptible to electrical noises from other sources. Therefore, ensuring the electronic devices to have a proper EMI shield and associated grounding path is one typical way for reducing the effects of EMI. But for those devices with hinged housings such as portable computers and cellular telephones, the EMI shield grounding path between the two EMI shielded housings is typically implemented in an unsatisfactory manner.

One known method is to make use of specifically configured conductive connectors making contact between the two housing shields. Unfortunately, these connectors themselves are typically susceptible to EMI absorption. Furthermore, they tend to be bulky, heavy and expensive. Another existing method is to use copper cladded and ferrite beaded cables. On the one hand, the extra copper shield on the cables makes the cables too stiff to withstand the rigors of portable computing. On the other hand, the bulk of the ferrite beads uses up premium real estate inside the housing. Furthermore, both of these methods have been used in parallel in the past with limited success.

Therefore, when designing an electronic equipment having hinged housings and where each housing provides EMI shielding, it is desirable for implementing a shield grounding path between the housings in a light, compact, and economical manner. In cases where EMI shields are not in place for those hinged housings having metallic enclosures, it is also desirable to provide a ground path implementation for the housing enclosures.

SUMMARY OF THE INVENTION

From the foregoing, therefore, for an electronic device having hinged housings and where each housing provides EMI shielding, it is an object to provide an apparatus implementing a compact, light and economical EMI shield grounding path between the housings. In cases where EMI shields are not in place for those hinged housings having metallic enclosures, it is another object of the present invention to provide a ground path implementation for the housing enclosures.

Another object of the present invention is to provide a hinge apparatus to which the hinged housings are rotably attached and at the same time, providing a grounding path between the hinged housings.

The present invention as applied to portable computers includes a hinge having a shaft about which a display housing rotates against a main body housing. Yet another object of the present invention is to provide a hinge that includes a shaft being used as a conducting path between the EMI shields or the hinged enclosures used in the main body housing and the display housing.

In accordance with these and other objects of the invention, a preferred embodiment is provided for overcoming the disadvantages of the prior art. Briefly, this preferred embodiment comprises a metallic hinge having a shaft and a tubular hinge housing brakingly engaged with and radially slidable over the shaft. A first end of the hinge housing is coaxially engaged and preferably substantially flush with a first shaft end whereas a second end of hinge housing sits on a radial shoulder of the shaft close to a second shaft end, that radial shoulder having a circumferential surface preferably substantially flush with that of the hinge housing. A flange integrally formed with the hinge housing proximal to the first shaft end is configured for receiving housing fastening means for affixing the hinge housing to a first hinged means and to its associated EMI shields. Whereas the second shaft end is configured for receiving shaft fastening means for affixing the shaft to a second hinged means and to its associated EMI shields.

One aspect of the metallic hinge-grounding conductor provides an electrically conductive path between the first and second hinged means. In this manner, EMI shields or metal enclosures between the two hinged means could be grounded easily, compactly, and with no additional cost and weight. Another aspect of the invention provides a conductive clip configured to sit on the flange making contact with the housing fastening means. This clip has a finger configured to rest firmly on the shaft preferably on the first shaft end whereby using the shaft itself to provide a low impedance path between the shaft and the hinge housing.

The invention generally described herein may be utilized in any electronic device having more than one hinged means and where each hinged means contains either electrical components or metallic enclosures. A partial list of the possible devices include portable computers, computer peripherals, testing equipment, game machines, multimedia equipment and telecommunication devices.

These and other objects and aspects of the present invention will no doubt become apparent upon a reading of the following description and a study of the several figures of the drawing.

BRIEF DESCRIPTION OF THE DRAWING

The accompanying drawings, which are incorporated in and form a part of this specification, illustrate a preferred embodiment of the invention and, together with the description, serve to explain the principles of the invention.

DETAILED DESCRIPTION

Reference will now be made in detail to a preferred embodiment of the invention, views of which are illustrated in the accompanying drawings. While the invention will be described in conjunction with the preferred embodiment, it will be understood that they are not intended to limit the invention to this embodiment. On the contrary, the invention is intended to cover alternatives, modifications and equivalents, which may be included within the spirit and scope of the invention as defined by the appended claims.

Figure 1A:
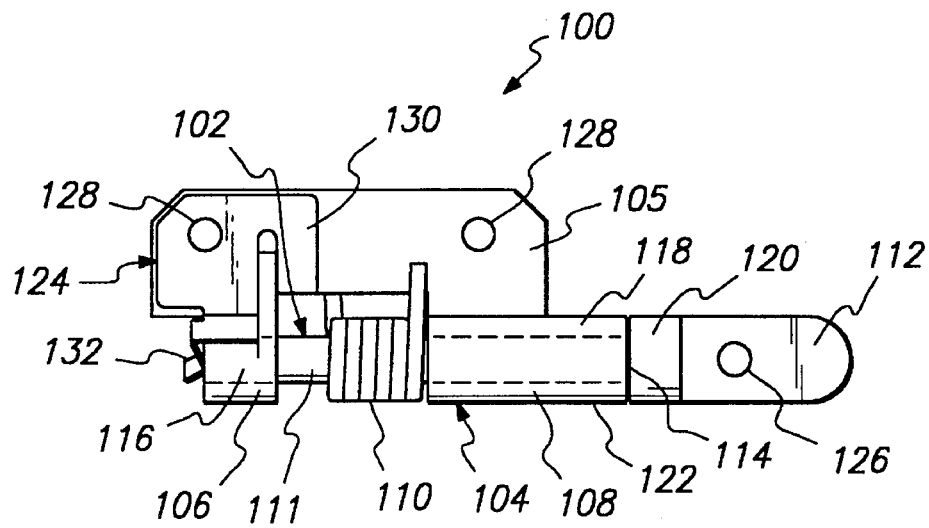
FIG. 1A shows a front view of a preferred embodiment according to the present invention.
Figure 1B:
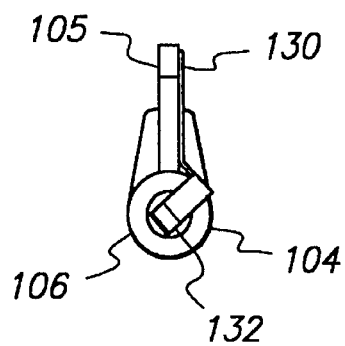
FIG. 1B shows an end view of the preferred embodiment according to the present invention.

FIG. 1A and FIG. 1B illustrate a front view and an end view respectively of a hinge-grounding conductor 100 in accordance with the present invention. The hinge-grounding conductor 100 can be of any metallic composition such as phosphorous bronze or steel but preferably be plated with a metal that has high conductivity, for example, tin.

This hinge-grounding conductor 100 has a generally cylindrical shaft 102 and a tubular hinge housing 104 operatingly disposed coaxial therewith. Preferably, the hinge housing 104 has two tubular sections 106, 108 and a flange 105 integrally connecting therebetween. The hinge-grounding conductor 100 further includes a spring 110, preferably a Z-spring which is also disposed coaxially with the shaft 102 between the two tubular sections 106, 108 and the spring 110 having its handles snapping against the flange 105 whereby enabling the hinge housing 104 to brakingly engage with and radially slidable over the shaft 102.

The shaft 102 has a first shaft end 111, a second shaft end 112 and a radial shoulder 114 radially extending from the shaft axis. A first end 116 of the hinge housing 104 is coaxially disposed in the same direction as that of the first shaft end 111; preferably, both ends substantially flush with each other. A second end 118 of the hinge housing 104 is received and seated on the radial shoulder 114 which is near the second shaft end 112. The second shaft end 112 does not engage the hinge housing 104 and is configured with a hole means 126 for receiving a shaft fastening means (not shown), for example, conductive nuts and bolts. Further, it is preferred that a radial circumferential surface 120 of the radial shoulder 114 flushes with a circumferential surface 122 of the second end 118 of the hinge housing 104. In practice, lubricants may be used to adjust the frictional constants necessary between the shaft 102 and the hinge housing 104; but in the present invention, if they are used, conductive lubricants are preferred.

The flange 105 of the hinge housing 104 is disposed near a first end 116 of the hinge housing 104. It is generally rectangular in shape but it can be configured into a variety of other shapes sufficient for its intended use. The flange 105 having a hole means 128 serves to receive a housing fastening means (not shown), typically conductive nuts and bolts; preferably, the flange 105 is configured to receive and mate with a conductive clip 124 which includes a clip body 130 and a clip finger 132. The clip body 130 sitting on the flange 105, is designed and implemented to make contact with the housing fastening means when fastened to the hole means 128. The clip finger 132 extends from the clip body 130 and rests firmly on shaft 102, for example, the first shaft end 111.

As stated earlier, the present invention may be utilized in any electronic device having more than one hinged means and where each hinged means contains either electrical components or metallic enclosures. As an example, the present invention may be implemented on a general purpose portable computer, such as one of several portable computer systems which are presently commercially available. A preferred embodiment of the present invention is implemented on an Apple Powerbook™ computer system developed by the assignee of the present invention.

Figure 1C:
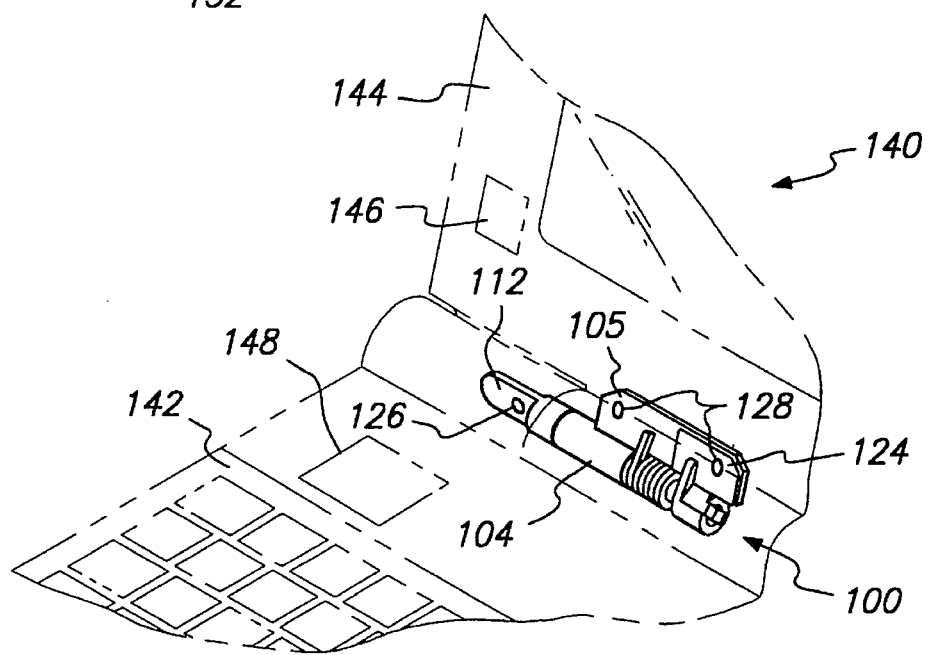
FIG. 1C shows how the preferred embodiment is used in a portable computer.

Now referring to FIG. 1C for an understanding of a typical operation of the present invention wherein a portable computer 140 is illustrated incorporating the hinge-grounding conductor 100. The portable computer 140 has a main body housing 142 rotably attached to a display housing 144 by one or more of hinge-grounding conductors 100 where only one not-necessarily-to-scale hinge-grounding conductor 100 is shown for clarity purposes. The display housing 144 contains a first conductive means 146 and the main body housing 142 contains a second conductive means 148. Both conductive means may be EMI shields typically constructed and implemented to reduce the effects of EMI, preferably, a metal layer plated over at least a significant portion of the undersides of the two housings 142, 144. In FIG. 1C, both conductive means 146, 148 are represented by rectangles (not shown to scale for clarity purposes) located inside their respective housings 142, 144.

It is preferred that the housing fastening means affixing the flange 105 of the hinge housing 104 to the display housing 144 via the hole means 128 and at the same time, affixing the flange 105 to the first conductive means 146 whereby making it 146 electrically connected to the hinge-grounding conductor 100 (the affixing process uses known methods and therefore not shown in the Drawings for clarity purposes). Similarly, it is preferred that the shaft fastening means affixing the shaft 102 to the main body housing 142 of the portable computer 140 and at the same time, affixing the shaft 102 using known methods to the second conductive means 148 whereby making it 148 electrically connected to the hinge-grounding conductor 100. Because the hinge housing 104 and the shaft 102 are themselves electrically connected, an EMI grounding path is therefore established between the two housings 142, 144 and the two conductive means 146, 148 via the hinge-grounding conductor 100. It is further preferred that the conductive clip 124, for example, a tin-plated thin metallic piece, is implemented to provide a low electrical impedance path between the shaft 102 and the hinge housing 104. The clip finger 132 rests firmly on the first shaft end 111 for good electrical contact but it can also be suitably adapted to rest in a variety of locations on the shaft 102.

The foregoing description of a specific embodiment of the present invention has been presented for purposes of illustration and description. It is not intended to be exhaustive or to limit the invention to the precise forms disclosed, and obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A metallic hinge comprises:

a generally cylindrical shaft having a first shaft end, a second shaft end and a radial shoulder being integrally formed with the shaft and being disposed proximally to the second shaft end, and the second shaft end being configured for receiving a shaft fastening means;

a tubular hinge housing brakingly engaged with and radially slidable over the shaft, said tubular hinge housing including a first housing end substantially flush with the first shaft end, a flange disposed close to the first housing end and configured for receiving a housing fastening means and the hinge housing further including a second housing end sitting on said radial shoulder of the shaft where the radial shoulder has a circumferential surface substantially flush with that of the hinge housing; and a conductive clip configured for sitting on the flange for making contact with the housing fastening means, said conductive clip including a finger implemented to rest firmly on the shaft whereby providing a low impedance path between the two fastening means.

2. The metallic hinge in claim 1 wherein said tubular hinge housing includes two tubular sections each coaxially disposed with, brakingly engaged with and radially slidable over the shaft, the two sections being unitarily constructed having the flange disposed therebetween.

3. The metallic hinge in claim 2 further includes a Z-spring coaxially disposed with the shaft and having the spring handles operatingly engaged with the flange.

4. The metallic hinge in claim 1 wherein the finger is implemented to rest firmly on the first shaft end.

5. A portable computer having a display housing and a main body housing, said portable computer comprises:

a display housing having a first conductive means;

a main body housing having a second conductive means;

said first and second conductive means being significant in size relative to the underside area of their respective housing and said display housing being rotably attached to the main body housing by one or more hinges, said one or more hinges comprising:

a generally cylindrical shaft having a first shaft end, a second shaft end and a radial shoulder integrally formed with the shaft disposed proximally to the second shaft end, and the second shaft end being configured for receiving a shaft fastening means for affixing the shaft to the second conductive means of the main body housing;

a tubular hinge housing brakingly engaged with and radially slidable over the shaft, said tubular hinge housing including a first housing end substantially flush with the first shaft end, a flange disposed close to the first housing end and configured for receiving a housing fastening means for affixing the hinge housing to the first conductive means of the display housing and the hinge housing further including a second housing end sitting on said radial shoulder of the shaft where the radial shoulder has a circumferential surface substantially flush with that of the hinge housing; and a conductive clip configured for sitting on the flange for making contact with the housing fastening means, said conductive clip including a finger implemented to rest firmly on the shaft whereby using the shaft as a low impedance path between the first and the second conductive means.

6. The portable computer in claim 5 wherein said second shaft end receives the shaft fastening means for additionally affixing the shaft to the main body housing.

7. The portable computer in claim 5 wherein said flange receives the housing fastening means for additionally affixing the hinge housing to the display housing.

8. The portable computer in claim 5 wherein the finger is implemented to rest firmly on the first shaft end.

9. The portable computer in claim 5 wherein the first and second conductive means each includes a metal-plated layer disposed on an underside of its respective housing.

10. The portable computer in claim 5 wherein the first and second conductive means each includes a conductive sheet disposed generally between an underside of its respective housing and its associated electrical components.

11. An electronic device having one or more operating portions being rotably attached by hinges and wherein each operating portion containing electrical components, said electronic device comprises:

a first hinged means having a first conductive means;

a second hinged means having a second conductive means;

said first and second hinged means being hingedly attached by one or more hinges, said one or more hinges comprising:

a generally cylindrical shaft having a first shaft end, a second shaft end and a radial shoulder integrally formed with the shaft disposed proximally to the second shaft end, and the second shaft end being configured for receiving a shaft fastening means for affixing the shaft to the second conductive means of the second hinged means;

a tubular hinge housing brakingly engaged with and radially slidable over the shaft, said tubular hinge housing including a first housing end substantially flush with the first shaft end, a flange disposed close to the first housing end and configured for receiving a housing fastening means for affixing the hinge housing to the first conductive means of the first hinged means and the hinge housing further including a second housing end sitting on said radial shoulder of the shaft where the radial shoulder has a circumferential surface substantially flush with that of the hinge housing; and a conductive clip configured for sitting on the flange for making contact with the housing fastening means, said conductive clip including a finger implemented to rest firmly on the shaft whereby using the shaft as a low impedance path between the first and the second conductive means.

12. The electronic device in claim 11 wherein the first and second conductive means each includes a metal-plated layer.

13. The electronic device in claim 11 wherein the first and second conductive means each includes a conductive sheet disposed generally between an underside of its respective hinged means and its associated electrical components.

14. The electronic device in claim 11 wherein the finger is implemented to rest firmly on the first shaft end.

* * * * *